(12) United States Patent
Dean et al.

(10) Patent No.: US 8,522,128 B1
(45) Date of Patent: *Aug. 27, 2013

(54) SYSTEMS AND METHODS FOR MODIFYING THE ORDER OF LINKS PRESENTED IN A DOCUMENT

(75) Inventors: Jeffrey A Dean, Menlo Park, CA (US);
Craig Silverstein, Stanford, CA (US);
Lawrence E Page, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 13/250,978

(22) Filed: Sep. 30, 2011

Related U.S. Application Data

(63) Continuation of application No. 09/734,883, filed on Dec. 13, 2000, now Pat. No. 8,127,220.

(60) Provisional application No. 60/171,011, filed on Dec. 15, 1999.

(51) Int. Cl.
*G06F 17/21* (2006.01)

(52) U.S. Cl.
USPC .......................... 715/206; 715/207; 715/208

(58) Field of Classification Search
USPC .................................................. 715/206, 207
See application file for complete search history.

(56) References Cited

U.S. PATENT DOCUMENTS

| | | | |
|---|---|---|---|
| 5,444,823 A | 8/1995 | Nguyen | |
| 5,446,891 A * | 8/1995 | Kaplan et al. | ................. 715/206 |
| 5,920,859 A | 7/1999 | Li | |
| 5,987,457 A | 11/1999 | Ballard | |
| 6,012,053 A | 1/2000 | Pant et al. | |
| 6,070,158 A | 5/2000 | Kirsch et al. | |
| 6,134,532 A | 10/2000 | Lazarus et al. | |
| 6,285,999 B1 | 9/2001 | Page | |
| 6,572,662 B2 | 6/2003 | Manohar et al. | |
| 6,591,261 B1 | 7/2003 | Arthurs | |
| 6,665,838 B1 | 12/2003 | Brown et al. | |
| 6,871,202 B2 | 3/2005 | Broder | |
| 7,908,277 B1 | 3/2011 | Page | |

OTHER PUBLICATIONS

Henry Lieberman; "Letizia: An Agent That Assists Web Browsing"; Proceedings of the Fourteenth International Joint Conference on Artificial Intelligence; 1995; 6 pages.

Elisabeth Andre et al.; "AiA: Adaptive Communication Assistant for Effective Infobahn Access"; German Research Center for Artificial Intelligence (DFKI); Mar. 20, 1997; 30 pages.

Co-pending U.S. Appl. No. 09/734,883, filed Dec. 13, 2000, entitled "Systems and Methods for Modifying Entries in Documents", Dean et al., 38 pages.

Office Action from U.S. Appl. No. 11/671,363, dated Jan. 26, 2009, 26 pages.

Office Action from U.S. Appl. No. 11/671,363, dated Oct. 15, 2009, 11 pages.

(Continued)

*Primary Examiner* — Doug Hutton, Jr.
*Assistant Examiner* — Ariel Mercado
(74) *Attorney, Agent, or Firm* — Harrity & Harrity, LLP

(57) ABSTRACT

A system modifies documents to aid users in determining which of the entries in the documents to choose. The system identifies a document that includes one or more entries. The system determines a score for each of the entries and modifies the identified document, or entries in the identified document, based on the determined scores. The system then provides the modified document to a user.

6 Claims, 8 Drawing Sheets

(56) References Cited

OTHER PUBLICATIONS

Page, "The PageRank Citation Ranking: Bringing Order to the Web", http://ilpubs.stanford.edu:8090/422/1/1999-66.pdf, Jan. 29, 1998, 17 pages.

S. Brin et al., "The Anatomy of a Large-Scale Hypertextual Web Search Engine," Proceedings of the Seventh Annual International World Wide Web Conference, 1998, pp. 107-117.

Armstrong et al., "WebWatcher: A Learning Apprentice for the World Wide Web", 1995, AAAI Spring Symposium on Information Gathering from Heterogeneous Distributed Environments, 7 pages.

McSherry, Frank, "A Uniform Approach to Accelerated PageRank Computation", ACM, 2005, pp. 575-582.

Mike Perkowitz, "Previous Work", Mar. 2, 1999, http://www8.org/w8-papers/2b-customizing/towards/node3.html, 2 pages.

Danny Sullivan, "Internet Explorer 5 Makes Search Easier", Apr. 5, 1999, The Search Engine Report, http://searchenginewatch.com/showPate.html?page=sew_Printer&id=2167191, 6 pages.

Danny Sullivan, Alexa Upgrades for Internet Explorer, Jun. 2, 1999, The Search Engine Report, http://searchenginewatch.com/showPage.html?page=sew_printer&id=2167191, 3 pages.

Masahiro Morita, Information filtering based on user behavior analysis and best match text retrieval, 1994, Springer-Verlag Publisher, pp. 272-281.

* cited by examiner

US 8,522,128 B1

SYSTEMS AND METHODS FOR MODIFYING THE ORDER OF LINKS PRESENTED IN A DOCUMENT

RELATED APPLICATIONS

This application is a continuation of U.S. application Ser. No. 09/734,883, filed Dec. 13, 2000 which claims priority under 35 U.S.C. § 119(e) based on U.S. Provisional Application Serial No. 60/171,011, filed Dec. 15, 1999, the disclosures of which are incorporated herein by reference.

BACKGROUND OF THE INVENTION

A. Field of the Invention

The present invention relates generally to information retrieval systems and, more particularly, to systems and methods that modify entries in a document.

B. Description of Related Art

A "document" may be defined as any type of document, such as a web document (e.g., a web page) that may be found on the World Wide Web ("web") or a word processing document (e.g., a Microsoft Word document) created or stored on a computer. Every document may include content and/or entries. "Content" may include data or other information relating to the document. An "entry" may be defined as a link or a link plus its link information. A "link" may be defined as a reference from one document to another or from one part of a document to another part of the same document. An example of a link in a web document is a hyperlink and an example of a link in a non-web document is a footnote or endnote. "Link information" may include information, such as text and/or other information, associated with a link.

Many existing hierarchical directories contain entries that include hyperlinks to other hyperlinked documents on the web. These entries may also contain descriptive text. When a user accesses a hierarchical directory, the user must decide which entry to choose. Often, the entries are ordered alphabetically and have no distinguishing characteristics that may aid the user in making a decision. Therefore, it is often difficult for a user to determine which entry in the directory to choose.

The same holds true for non-directory documents. For example, a non-directory document may contain one or more entries that include links to and from other documents or other portions of the same document. Users often follow the links to locate documents or information of interest. The entries may be located anywhere in the documents and typically contain no distinguishing features that aid the user in determining which entry or entries to select.

As a result, there exists a need for distinguishing entries in documents to aid a user in determining which entry or entries to choose.

SUMMARY OF THE INVENTION

Systems and methods consistent with the present invention address this and other needs through the use of mechanisms that assign a score to entries and order, delete, annotate, or otherwise visually distinguish them based on their scores. Thus, the systems and methods facilitate the selection of one or more of the entries by distinguishing entries of higher quality or greater importance from entries of lower quality or lesser importance.

In accordance with the purpose of the invention as embodied and broadly described herein, a system modifies entries in documents to aid users in determining which of the entries to choose. The system identifies a document that includes one or more entries. The system determines a score for each of the entries and modifies the identified document, or the entries in the identified document, based on the determined scores. The system then provides the modified document to a user.

In another implementation consistent with the present invention, a web browser includes instructions for requesting documents stored on at least one server, where each of the documents includes one or more entries. The web browser also includes instructions for determining scores for each of the entries, modifying the requested documents based on the determined scores, and presenting the modified documents to facilitate selection of one or more of the entries.

In yet another implementation consistent with the present invention, a method modifies entries in an existing document to aid a user in determining which of the entries to select. The method includes receiving a request for a document that includes one or more entries; determining a score for each of the entries in the document; modifying the entries by reordering, deleting, visually distinguishing, and/or annotating the entries based on the determined scores; and providing the document with the modified entries to the user.

In a further implementation consistent with the present invention, a first server operates in a network that includes the first server and multiple second servers. The first server includes a processor and a memory that stores instructions. The processor executes the instructions in the memory to obtain, from one of the second servers, one or more entries from a document, determine scores for the one or more entries, and return the scores to the second server.

In another implementation consistent with the present invention, a first server operates in a network that includes the first server and at least one second server. The first server includes a processor and a memory that stores instructions. The processor executes the instructions in the memory to obtain a document that includes one or more entries from the second server, determine a score for a number of the entries, modify the entries based on the determined scores, and send the document with the modified entries to the second server.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention modify entries in documents to aid a user in determining which entry to choose. The systems and methods modify the document entries to distinguish entries that are of higher quality and/or greater importance from entries of lower quality and/or lesser importance.

EXEMPLARY NETWORK WITH BROWSER ASSISTANT

Figure 1:
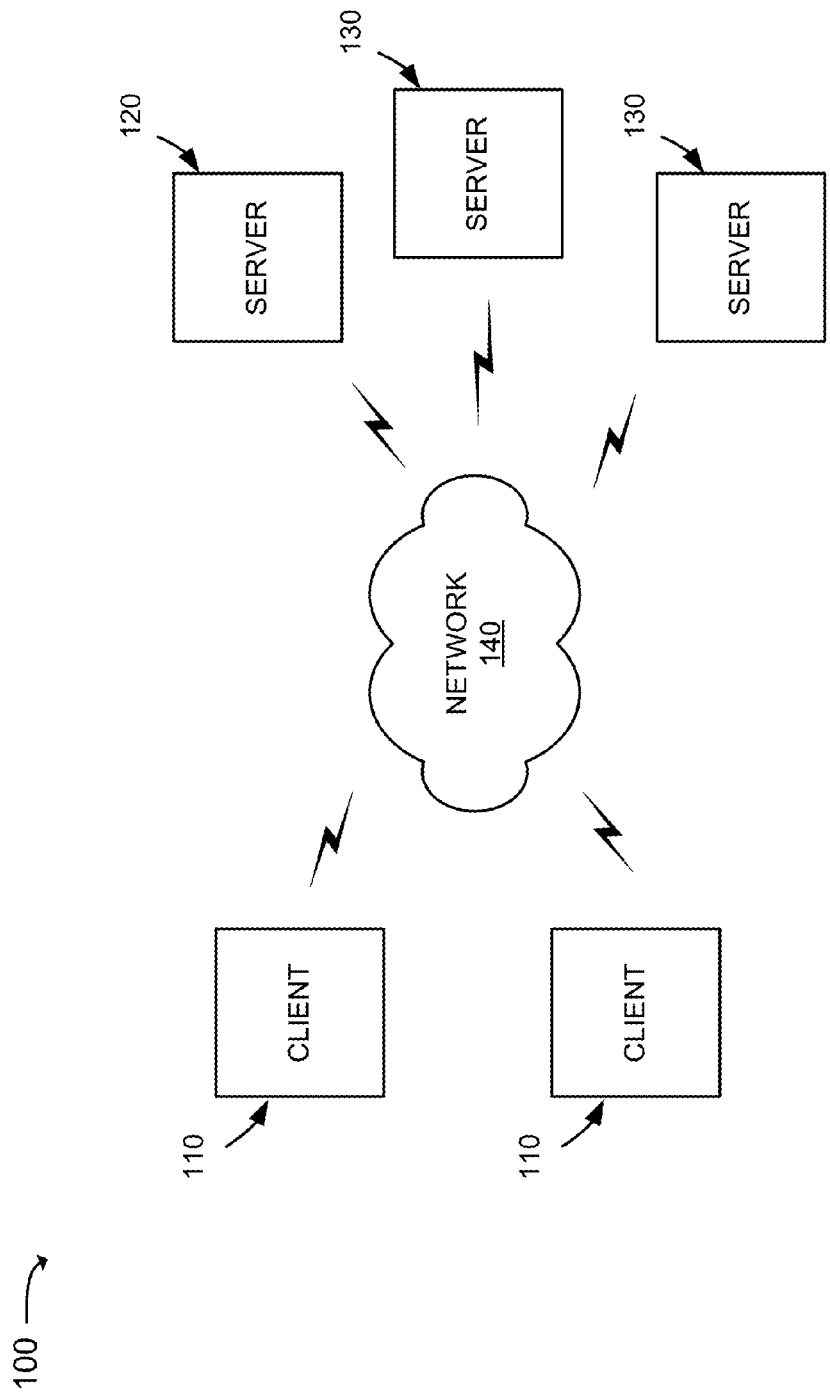
FIG. 1 is a diagram of an exemplary network in which systems and methods consistent with the present invention may be implemented.

FIG. 1 is an exemplary diagram of a network 100 in which systems and methods consistent with the present invention may be implemented. The network 100 may include multiple clients 110 connected to multiple servers 120-130 via a network 140. The network 140 may include a local area network (LAN), a wide area network (WAN), a telephone network, such as the Public Switched Telephone Network (PSTN), an intranet, the Internet, a similar or dissimilar network, or a combination of networks. Two clients 110 and three servers 120-130 have been illustrated as connected to network 140 in FIG. 1 for simplicity. In practice, there may be more or less clients and servers. Also, in some instances, a client may perform the functions of a server and a server may perform the functions of a client.

The clients 110 may include devices, such as wireless telephones, personal computers, personal digital assistants (PDAs), lap tops, etc., threads or processes running on these devices, and/or objects executable by these devices. The servers 120-130 may include server devices, threads, and/or objects that operate upon, search, or maintain documents in a manner consistent with the present invention. The clients 110 and servers 120-130 may connect to the network 140 via wired, wireless, or optical connections.

In an implementation consistent with the present invention, the server 120 may include a search engine usable by the clients 110 and may maintain information on documents stored by other servers in the network 140. The servers 130 may store documents accessible by the clients 110. In this implementation, the servers 130 are not affiliated with the server 120.

EXEMPLARY CLIENT ARCHITECTURE

Figure 2:
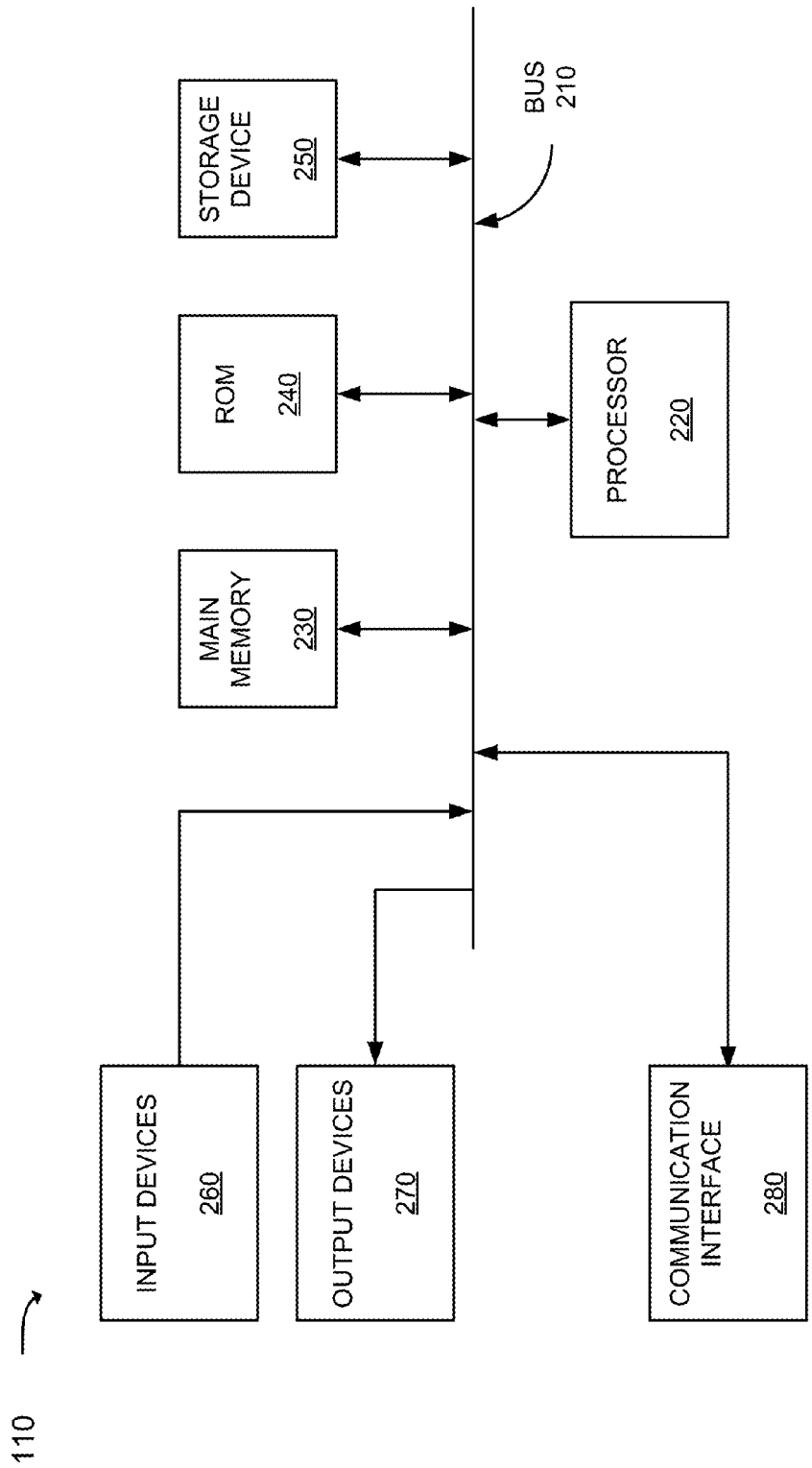
FIG. 2 is an exemplary diagram of a client of FIG. 1 in an implementation consistent with the present invention.

FIG. 2 is an exemplary diagram of a client 110 in an implementation consistent with the present invention. The client 110 may include a bus 210, a processor 220, a main memory 230, a read only memory (ROM) 240, a storage device 250, one or more input devices 260, one or more output devices 270, and a communication interface 280. The bus 210 may include one or more conductors that permit communication among the components of the client 110.

The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input devices 260 may include one or more conventional mechanisms that permit a user to input information to the client 110, such as a keyboard, a mouse, a pen, voice recognition and/or biometric mechanisms, etc. The output devices 270 may include one or more conventional mechanisms that output information to the user, including a display, a printer, a speaker, etc. The communication interface 280 may include any transceiver-like mechanism that enables the client 110 to communicate with other devices and/or systems. For example, the communication interface 280 may include mechanisms for communicating with another device or system via a network, such as network 140.

As will be described in detail below, the clients 110, consistent with the present invention, perform certain searching-related operations. The clients 110 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as the data storage device 250, or from another device via the communication interface 280. The software instructions contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

EXEMPLARY COMPUTER-READABLE MEDIUM

Figure 3:
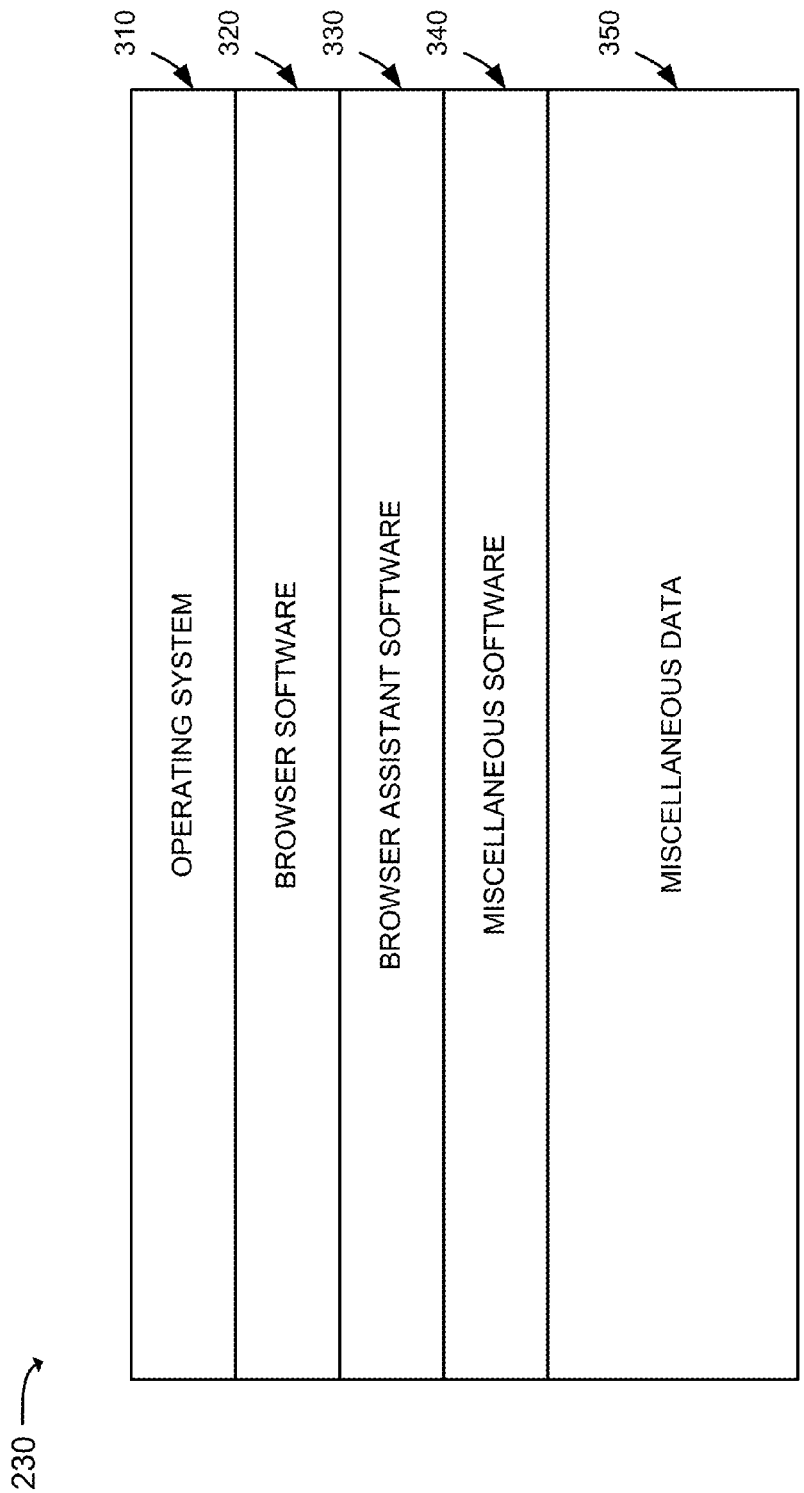
FIG. 3 is a diagram of an exemplary computer-readable medium used by the clients of FIG. 1 according to an implementation consistent with the present invention.

FIG. 3 is a diagram of an exemplary computer-readable medium used by the clients 110 according to an implementation consistent with the present invention. In this implementation, the computer-readable medium includes memory 230. The memory 230 may include an operating system 310, browser software 320, browser assistant software 330, miscellaneous other software 340, and miscellaneous data 350.

The operating system 310 may include conventional operating system software, such as the Windows, Unix, or Linux operating systems. The browser software 320 may include conventional web browser software, such as the Microsoft Internet Explorer or Netscape Navigator browsers.

The browser assistant software 330 may include a plug-in, an applet, a dynamic link library (DLL), or a similar executable object or process. The client 110 may obtain the plug-in from a server, such as the server 120 or 130, or from a disk, tape, network, CD-ROM, etc. Alternatively, the plug-in may be pre-installed on the client 110.

In another implementation consistent with the present invention, the browser assistant 330 is part of the browser 320. In this implementation, the browser 320 performs the functions of the browser assistant 330. In yet another implementation, the browser assistant 330 is a process separate from and runs concurrently with the browser 320. In this implementation, the browser assistant 330 may interface between the browser 320 and the network 140.

The browser assistant 330 may be automatically activated upon initiation of the browser 320. Alternatively, the browser assistant 330 may be activated when instructed by a user. In either case, the browser assistant 330 may take the form of a graphical user interface, such as a tool bar, software button, or menu, that provides an extension to the browser 320.

Figure 4:
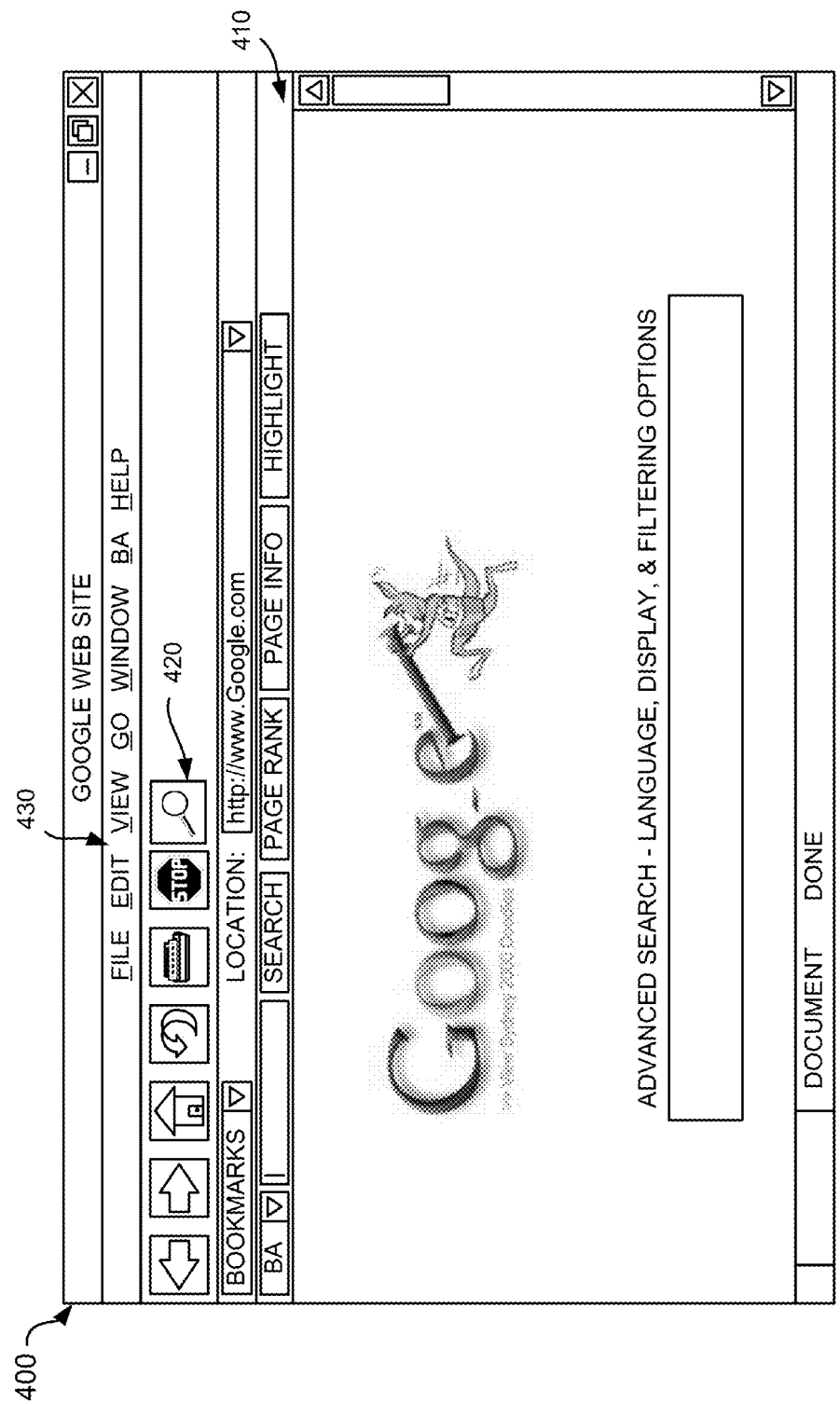
FIG. 4 is an exemplary diagram of a graphical user interface that includes the browser assistant of FIG. 3 according to an implementation consistent with the present invention.

FIG. 4 is an exemplary diagram of a graphical user interface 400 that includes a browser assistant (BA) 330 according to an implementation consistent with the present invention. The graphical user interface 400 illustrated in FIG. 4 shows three forms of the browser assistant 330: a tool bar 410, a software button 420, and a menu 430. The browser assistant 330 may take other forms.

The tool bar 410 includes software buttons and/or menus selectable by a user to initiate different operations by the browser assistant 330. In this case, a user may activate a function of the browser assistant 330 by selecting one of the software buttons and/or menus. The software button 420 may be selectable by a user to initiate the browser assistant 330 functionality. In this case, a user may activate a function of the browser assistant 330 by selecting the desired button using, for example, a mouse. The menu 430 may provide a list of functions that the browser assistant 330 is capable of performing. A user may select from the list to activate the browser assistant 330 and instruct the browser assistant 330 to perform the desired function.

The browser assistant 330 may intercept data regarding a document, such as HyperText Markup Language (HTML) data, that a user desires to access. The browser assistant 330 may parse the document to identify the entries contained in the document. The browser assistant 330 may then determine scores for the document and for the entries in the document. As described in more detail below, the browser assistant 330 may make this determination itself or with the help of a server, such as server 120 or 130. The browser assistant 330 may then modify data in the document based on the determined scores. The user may use the modified document data to determine which entry to choose.

Returning to FIG. 3, the miscellaneous other software 340 and miscellaneous data 350 may include programs and data used by the client 110 to perform searching-related and non-searching-related operations.

EXEMPLARY SERVER ARCHITECTURE

Figure 5:
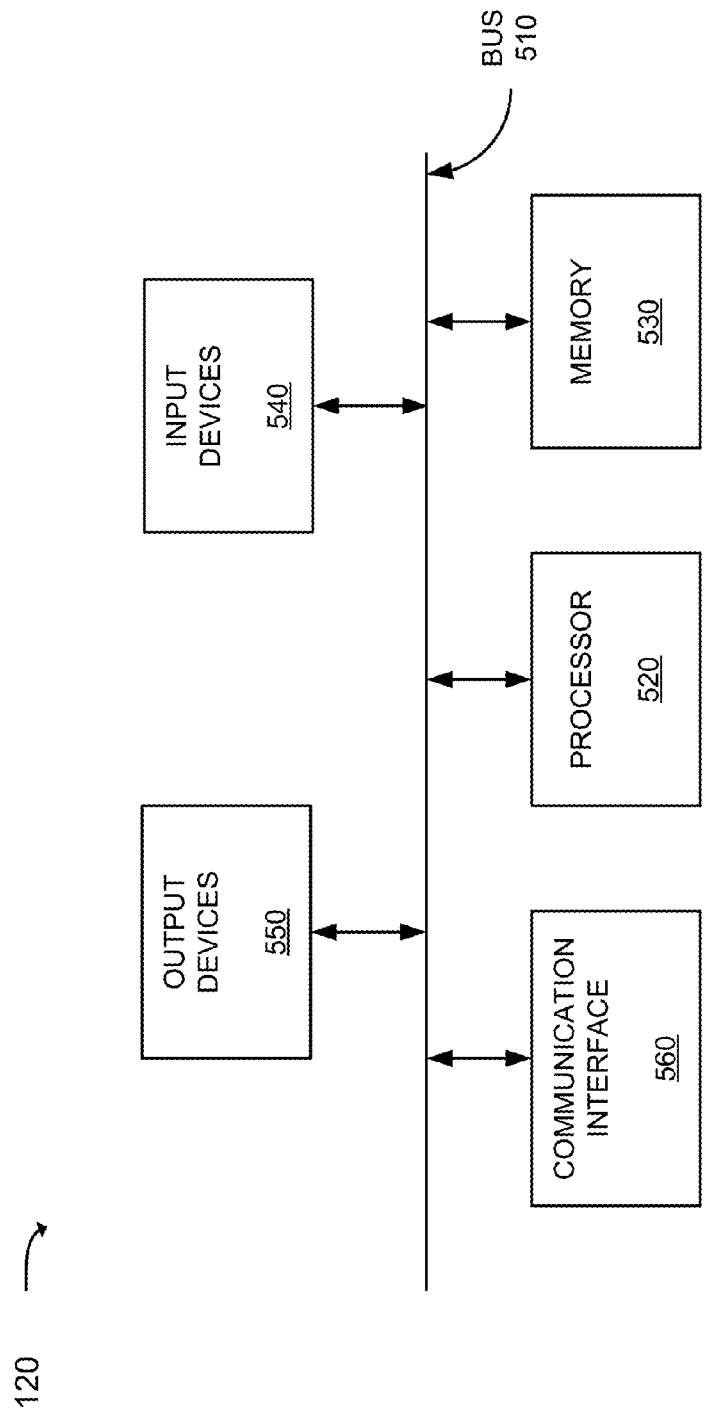
FIG. 5 is an exemplary diagram of a server of FIG. 1 according to an implementation consistent with the present invention.

FIG. 5 is an exemplary diagram of the server 120 according to an implementation consistent with the present invention. The servers 130 may be similarly configured.

The server 120 may include a bus 510, a processor 520, a memory 530, one or more input devices 540, one or more output devices 550, and a communication interface 560. The bus 510 permits communication among the components of the server 120. The processor 520 may include any type of conventional processor or microprocessor that interprets and executes instructions. The memory 530 may include a RAM or another type of dynamic storage device that stores information and instructions for execution by the processor 520; a ROM or another type of static storage device that stores static information and instructions for use by the processor 520; and/or some other type of magnetic or optical recording medium and its corresponding drive.

The input devices 540 may include one or more conventional mechanisms that permit an operator to input information into the server 120, such as a keyboard, mouse, pen, etc. The output devices 550 may include one or more conventional mechanisms that output information to the operator, including a display, a printer, a speaker, etc. The communication interface 560 may include any transceiver-like mechanism that enables the server 120 to communicate with other devices and systems via a network, such as the network 140.

As will be described in detail below, the server 120, consistent with the present invention, performs certain searching-related operations. The server 120 may perform these operations in response to processor 520 executing software instructions contained in a computer-readable medium, such as memory 530. The software instructions may be read into memory 530 from another computer-readable medium or from another device via the communication interface 560. The software instructions contained in memory 530 causes processor 520 to perform processes that will be described later. Alternatively, hardwired circuitry may be used in place of or in combination with software instructions to implement processes consistent with the present invention. Thus, the present invention is not limited to any specific combination of hardware circuitry and software.

EXEMPLARY PROCESSING WITH BROWSER ASSISTANT

Figure 6:
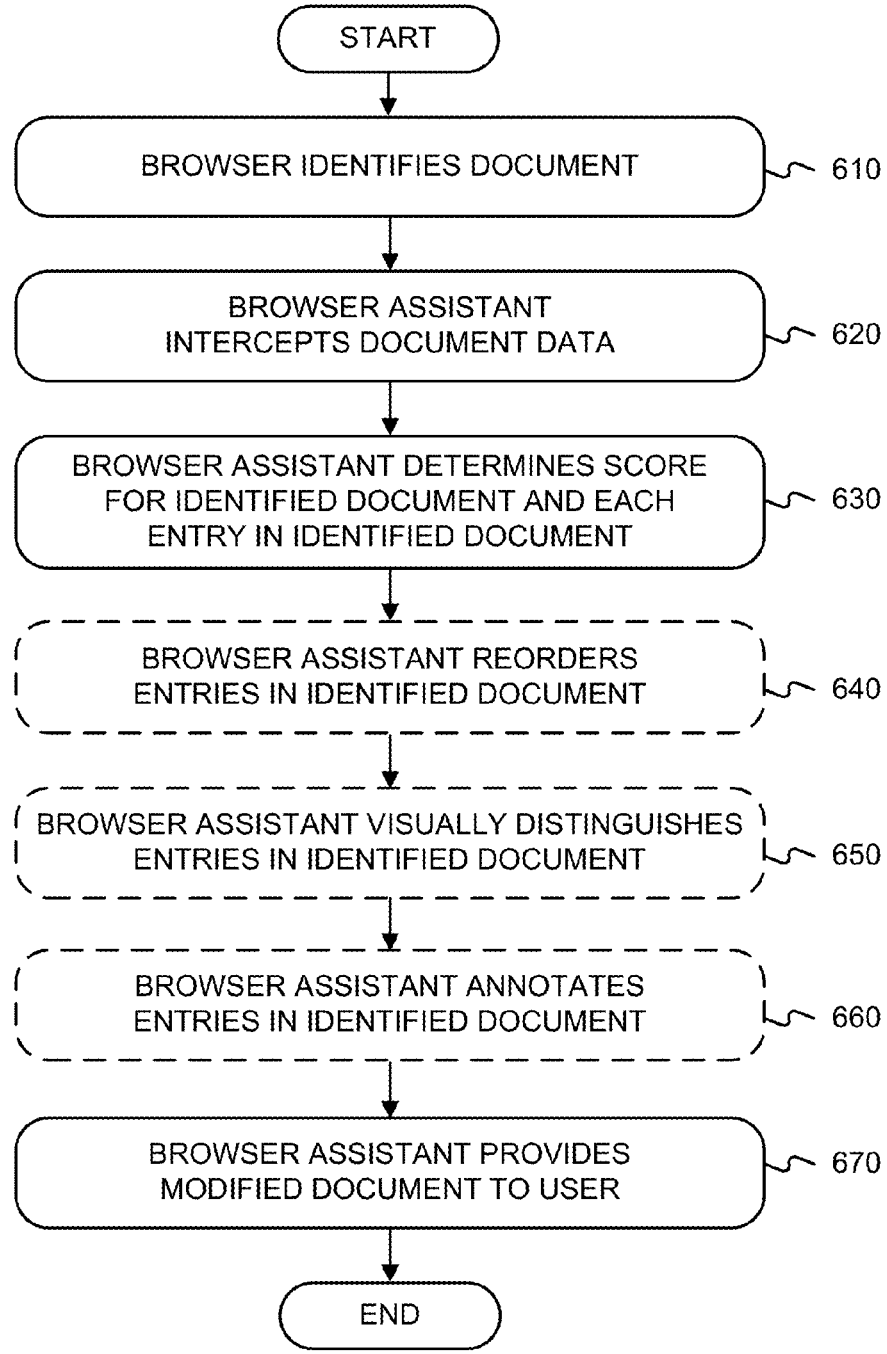
FIG. 6 is a flowchart of exemplary processing for modifying a document to facilitate the selection of entries in accordance with an implementation consistent with the present invention.

FIG. 6 is a flowchart of exemplary processing for modifying a document to facilitate the selection of entries in accordance with an implementation consistent with the present invention. Processing may begin with a user activating web browser software, such as browser 320 (FIG. 3), on a client, such as client 110 (FIG. 1). The user may then provide an address, such as a Uniform Resource Locator (URL), of a document to the browser 320 or a query that the browser 320 uses to obtain an address of one or more documents using a search engine, such as the search engine maintained by the server 120. Assume for the discussion that follows that one of the servers 130 stores the document desired by the user and that the browser assistant 330 has been activated.

The browser 320 may identify the document on the server 130 in a conventional manner using the address or query provided by the user [act 610]. In response to signals from the browser 320, the server 130 may provide document data, possibly in the form of HTML data, to the browser 320. The browser assistant 330 may intercept the document data from the server 130 and, if the document data takes the form of HTML data, may parse the document data to identify the entries contained therein [act 620]. The browser assistant 330 may then partition the entire document or a portion of the document based on the entries.

The browser assistant 330 may then determine a score for the identified document and scores for the entries in the identified document [act 630]. The score for an entry may be related to, derived from, or the same as the score of the document to which the entry refers. Scores may be determined for all documents maintained by servers in the network 140 or for only the documents containing links from the identified document. For example, if the document is part of a hierarchical directory, scores may be determined for only those documents in the hierarchical directory.

The browser assistant 330 may use different techniques to determine the document scores. For example, each of the documents may be scored based on the scores of the documents that point to (i.e., link to) the identified document. This technique is described in detail by S. Brin et al. in "The Anatomy of a Large-Scale Hypertextual Web Search Engine," In Proceedings of the Seventh International World Wide Web Conference, pp. 107-117, 1998, which is hereby incorporated by reference.

In another technique, the score of a document may be determined as a function of its clickthrough rate (i.e., the number of times users clicked on the document over a period of time). The clickthrough rate may be obtained in a conventional manner by redirecting user clicks through the server hosting the document. Clickthrough measurements are commonplace in many current web sites, such as advertising web sites.

In yet another technique, the score of a document may be determined as a function of the popularity of the document or the web site containing the document. The popularity of a document may be obtained from traffic data published by various Internet traffic analysis companies (e.g., Media Metrix) or by analyzing HyperText Transfer Protocol (HTTP) traffic of a representative subset of users (e.g., from a web proxy log).

In a further technique, the score of a document may be determined based on input received before or at the time the document is accessed. The input might include the user query that resulted in the document being accessed. In this case, the score of a document may be based on the match between the query and the contents of the document. Alternatively, the input may include a user profile. For example, the user profile may include a set of words that have appeared in documents that the user has previously accessed, along with a score for each word denoting its estimated importance. In this case, the score of a document may be determined by considering the user profile to be a weighted query and evaluating the match between the user profile and the contents of the document.

These scoring techniques are meant to be examples. Other techniques or combinations of scoring techniques may be used in other implementations consistent with the present invention.

The browser assistant 330 may determine the scores itself. For example, the browser assistant 330 may record information regarding the documents that a user previously accessed and determine the scores based on this information. Alternatively, the browser assistant 330 may interact with a server, such as the server 120. In this case, the server 120 may maintain information regarding the scores of documents maintained by other servers in the network 140. The server 120 may obtain information regarding the documents in the network 140 using, for example, a spider (i.e., a program that prowls a network to locate publicly accessible resources, such as documents). The browser assistant 330 may identify to the server 120 the document currently being requested by the user. The server 120 may then inform the browser assistant 330 of the score of the requested document and the scores of the entries in the requested document.

Once the scores of the requested document and the entries in the document have been determined, the browser assistant 330 may perform one or more acts to modify the entries in the document to make the entries more useful to the user.

For example, the browser assistant 330 may reorder the entries in the document based on the scores associated with the entries [act 640]. The browser assistant 330 may sort the entries based on their scores. For example, the browser assistant 330 may order the entries in decreasing order of their scores.

In addition or alternatively, the browser assistant 330 may visually distinguish the entries in the document based on their scores [act 650]. For example, the browser assistant 330 may place entries with higher scores in more prominent locations in the document, or change the font, style, size, color, or other characteristics of the entries based on their scores. In addition or alternatively, the browser assistant 330 may delete entries with scores below a predetermined threshold to give more prominence to entries with higher scores.

In addition or alternatively, the browser assistant 330 may annotate the entries in the document based on their scores [act 660]. For example, the browser assistant 330 may annotate the entries with their scores or with icons associated with their scores, such as using a "rating" symbol (e.g., associating each score with a rating of one to five stars). The browser assistant 330 may provide additional information for entries with scores above a predetermined threshold. For example, the browser assistant 330 may provide a relevant excerpt, size, download rate, the date of the last modification, etc. for entries with scores above the threshold. For entries with scores above the threshold, the browser assistant 330 may also provide links to documents, with or without scores, that relate to these entries.

Once the document has been modified, the browser assistant 330 may provide the modified document to the user to aid the user in determining which entry or entries to select [act 670]. The browser assistant 330 may provide the document via a window on a display, open a new window for the document, or show the modifications on the original document when instructed by the user, such as when the user places a cursor over the entry, selects a software button, enters a combination of key strokes, etc. The browser assistant 330 may also provide the score of the modified document to the user.

EXEMPLARY NETWORK WITHOUT BROWSER ASSISTANT

Figure 7:
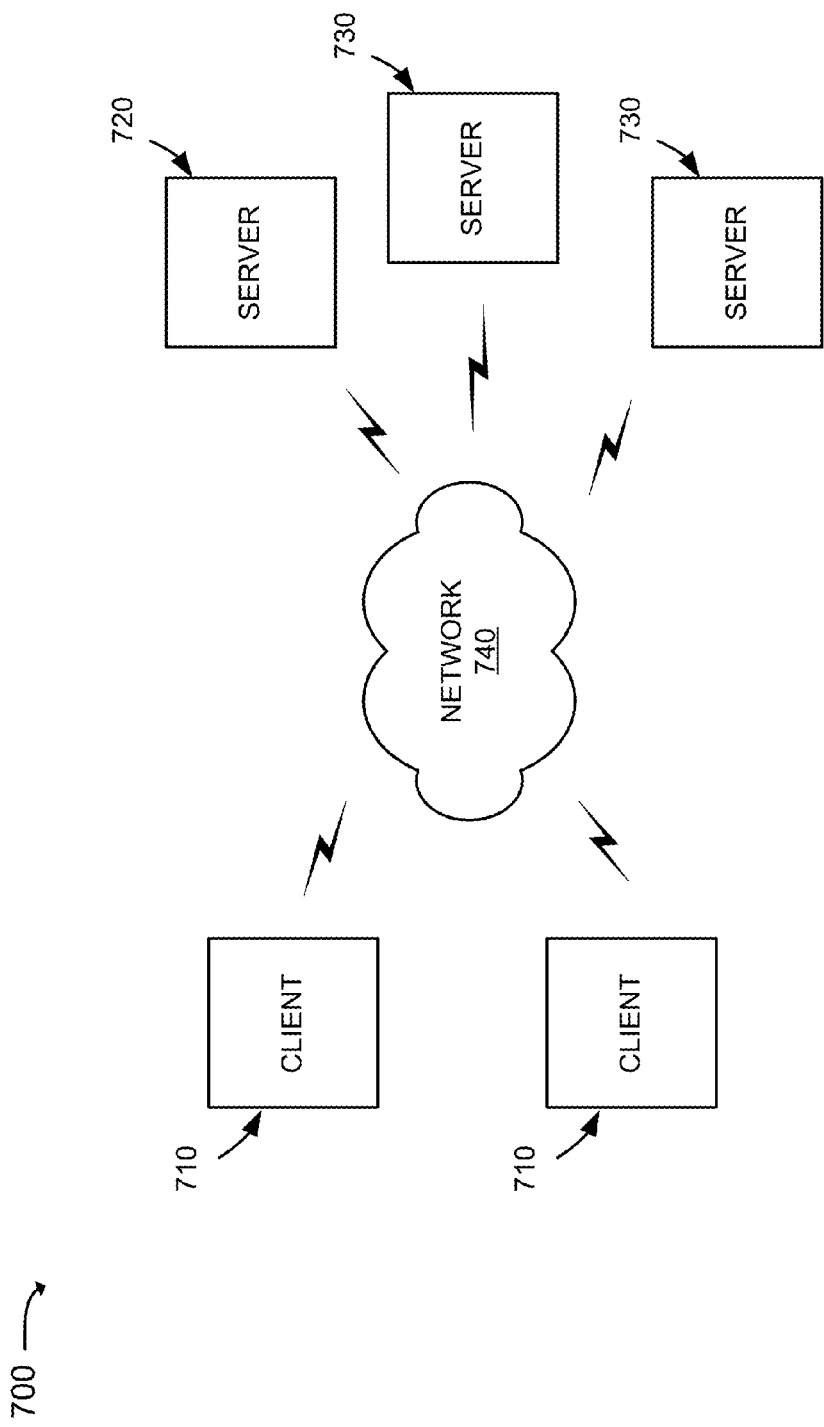
FIG. 7 is a diagram of an exemplary alternate network in which systems and methods consistent with the present invention may be implemented.

FIG. 7 is an exemplary diagram of an alternate network 700 in which systems and methods consistent with the present invention may be implemented. The network 700 may include multiple clients 710 connected to multiple servers 720-730 via a network 740. The network 740 may include a LAN, a WAN, a telephone network, such as the PSTN, an intranet, the Internet, a similar or dissimilar network, or a combination of networks. The clients 710 and servers 720-730 may connect to the network 740 via wired, wireless, or optical connections. Two clients 710 and three servers 720-730 have been illustrated as connected to network 740 in FIG. 7 for simplicity. In practice, there may be more or less clients and servers.

The clients 710 may include devices, such as wireless telephones, personal computers, PDAs, lap tops, etc., threads or processes running on these devices, and/or objects executable by these devices. The clients 710 may be configured similar to the clients 110 in FIG. 1. Unlike the clients 110, however, the clients 710 need not include browser assistant software.

The servers 720-730 may include server devices, threads, and/or objects that operate upon, search, or maintain documents in a manner consistent with the present invention. The server 720 may be configured similar to the server 120 in FIG. 1. The servers 730 may be configured similar to the servers 130 in FIG. 1. Unlike the servers 130, however, the servers 730 may or may not be affiliated with the server 720.

EXEMPLARY PROCESSING WITHOUT BROWSER ASSISTANT

Figure 8:
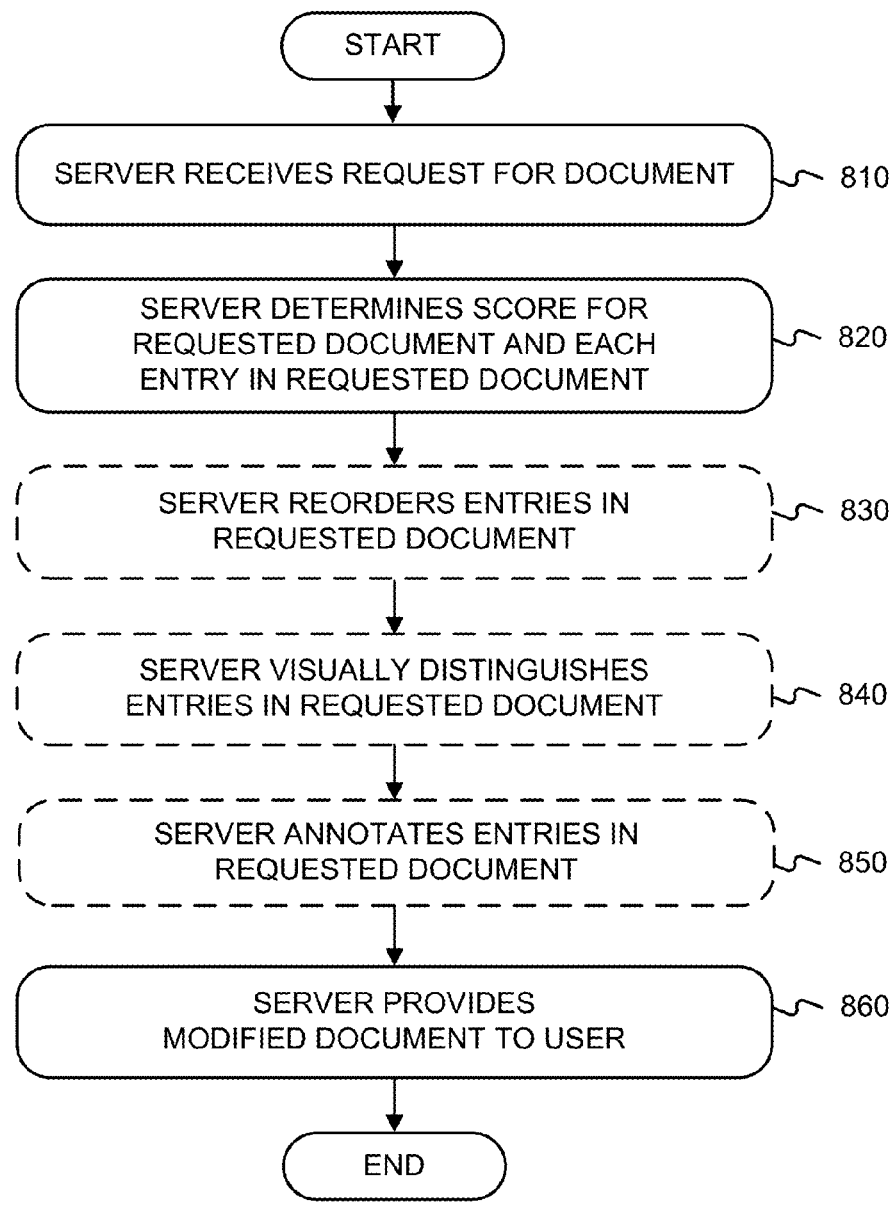
FIG. 8 is a flowchart of exemplary processing for modifying a document to facilitate the selection of entries in accordance with an alternate implementation consistent with the present invention.

FIG. 8 is a flowchart of exemplary processing for modifying a document to facilitate the selection of entries in accordance with an alternate implementation consistent with the present invention. Processing may begin with a user activating web browser software on a client, such as client 710 (FIG. 7). The user may then provide an address, such as a URL, of a document to the browser or a query that the browser uses to obtain an address of a document using a search engine.

Assume for the discussion that follows that one of the servers 730 stores the document desired by the user.

The browser may request the document on the server 730 in a conventional manner using the address or query provided by the user [act 810]. In response to signals from the browser, the server 730 may determine a score for the requested document and scores for the entries in the requested document [act 820]. The score of an entry may be related to, derived from, or the same as the score of the document to which the entry refers. Scores may be determined for all documents maintained by servers in the network 740 or for only the documents containing links from the requested document. For example, if the requested document is part of a hierarchical directory, scores may be determined for only those documents in the hierarchical directory.

The server 730 may use different techniques to determine the document scores, such as the scoring techniques described above with regard to FIG. 6. The server 730 may also determine the scores for the entries within a document in other ways. For example, the server 730 may interact with another server, such as the server 720. In this case, the server 720 may maintain information regarding the scores of documents maintained by servers in the network 740. The server 730 may identify to the server 720 the document currently being requested by the user. The server 720 may then inform the server 730 of the score of the requested document and the scores of the entries in the requested document.

In the case where the server 730 is not affiliated with the server 720, the server 730 may provide to the server 720 information regarding one or more entries in a document. The server 720 may determine scores for the entries using one of the scoring techniques described above or other techniques and return the scores to the server 730. The server 730 may then modify the document based on the scores for the entries contained in the document.

Alternatively, the server 730 may provide the server 720 with the entire document. The server 720 may identify the entries in the document and determine scores for the entries using one of the scoring techniques described above or other techniques. The server 720 may then return the modified document to the server 730.

In any event, the server 730 or 720 may modify the document based on the scores determined for the entries in the document to make the document more useful to a user. For example, the server 730/720 may reorder, delete, visually distinguish, and/or annotate the entries in the document based on their scores, as described above with regard to FIG. 6 [acts 830-850]. The server 730 may then provide the modified document to the user, via the browser, using one of the techniques described above or other techniques [act 860].

While the foregoing acts have been described as being performed by the server 730, one or more of the acts may be performed by the server 720 in other implementations consistent with the present invention.

CONCLUSION

Systems and methods consistent with the present invention modify entries in a document to aid a user in deciding which entry to select. Thus, the present invention makes it easier for a user to locate and distinguish entries that are of high quality and greater importance, thereby enhancing the search process. As a result, the user can more quickly determine which entries in a document to select. Also, the systems and methods may be fully automated to facilitate the implementation of changes that track the evolution of the linked environment.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts have been described with regard to FIGS. 6 and 8, the order of the acts may be modified in other implementations consistent with the present invention.

Also, two separate network configurations have been described with regard to FIGS. 1 and 7. Other configurations or a combination of configurations may occur in other implementations consistent with the present invention.

The scope of the invention is defined by the claims and their equivalents.

What is claimed is:

1. A system comprising:
one or more servers to:
   obtain, from a client device, an address of a corresponding document that is stored on a device in a network, the corresponding document including links to respective other documents;
   determine a score for each of the links in the corresponding document;
   modify, based on the determined scores, the corresponding document;
   where, when modifying the corresponding document, at least one of the one or more servers is to perform the following functions in the corresponding document:
      reorder two or more of the links based on the respective determined scores,
      delete one or more of the links having a determined score that is below a predetermined threshold, and
      for the links having determined scores above the predetermined threshold, include one or more additional links to respective one or more additional documents that relate to a respective one of links other documents; and provide the modified document for display at the client device.

2. The system of claim 1, where, when modifying the obtained document, at least one of the one or more servers is further to:
   visually distinguish at least one of the links.

3. The system of claim 1, where at least one of the one or more servers is further to:
   receive a selection of the one or more additional links, and
   provide the respective other document based on receiving the selection.

4. A system comprising:
one or more servers to:
   obtain, from a client device, an address of a corresponding document that is stored on a device in a network, the corresponding document including links to respective linked documents;
   determine scores for two or more of the links in the corresponding document;
   reorder the two or more of the links in the corresponding document based on the determined scores;
   in the corresponding document, delete one or more of the links having a determined score that is below a predetermined threshold; and
   for the links having determined scores above the predetermined threshold, include one or more additional links to respective one or more additional documents that relate to a respective one of the linked documents; and provide the corresponding document to the client device.

5. The system of claim 4, where at least one of the one or more servers is further to:
visually distinguish at least one of the two or more of the links.

6. A device comprising:
a non-transitory computer-readable memory device to store instructions; and
one or more processors to execute the instructions to:
 obtain, from a client device, an address of a corresponding document that is stored on a server in a network, the corresponding document including links to respective linked documents, the links arranged in a first order within the corresponding document;
 determine scores for each of the links in the corresponding document;
 arrange the links in a second order based on the determined scores, the second order being different from the first order;
 in the corresponding document, delete one or more of the links having a determined score that is below a predetermined threshold;
 for the links having determined scores above the predetermined threshold, include one or more additional links to respective one or more additional documents that relate to a respective one of the linked documents; and
present the corresponding document to a user via the client device.

\* \* \* \* \*

UNITED STATES PATENT AND TRADEMARK OFFICE
CERTIFICATE OF CORRECTION

PATENT NO. : 8,522,128 B1
APPLICATION NO. : 13/250978
DATED : August 27, 2013
INVENTOR(S) : Jeffrey A. Dean et al.

Page 1 of 1

It is certified that error appears in the above-identified patent and that said Letters Patent is hereby corrected as shown below:

In the Claims

Column 10, claim 1, line 38, following the words "on of" delete "links" and insert --the--.

Signed and Sealed this
Eighth Day of October, 2013

Teresa Stanek Rea
*Deputy Director of the United States Patent and Trademark Office*